United States Patent Office
3,367,946
Patented Feb. 6, 1968

1

3,367,946
XANTHENE DYES

Harvey Irvin Stryker, Carney's Point, N.J., assignor to E. I. du Pont de Nemours and Company, Wilmington, Del., a corporation of Delaware No Drawing. Filed Oct. 22, 1964, Ser. No. 405,831
2 Claims. (Cl. 260—336)

ABSTRACT OF THE DISCLOSURE

Water soluble xanthene dyes which are useful for tracing water currents.

Background of the invention

This invention is directed to novel dyes of the xanthene series which dyes have significant utility in the tracing of water currents.

Heretofore, xanthene dyes have been used for the purpose of tracing water currents chiefly because of their high tinctorial value, their fluorescent properties and their relatively low cost coupled with the fact that their presence in great dilution, as in ocean currents, can be readily detected. Illustrative of the dyes used for this purpose is Rhodamine B, also known as Colour Index Basic Violet 10 or Colour Index 45170 which has the structure,

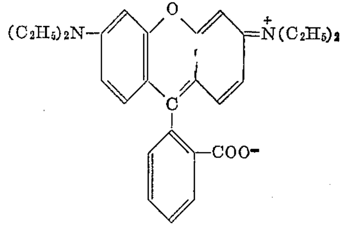

Water soluble dyes of this type have been found, however, to be unsuitable for use in tracing water currents where they come in contact with siliceous matter such as sand, rocks, concrete and the like. In said application, the dyes rapidly become diluted to extreme dilutions. If the dye exhibits any appreciable affinity for siliceous matter, the dye concentration in the water is sooner reduced to the point where only a negligible amount remains in solution, which amount is insufficient to permit instrumental detection of the fluorescent dye. Thus, the intended purpose of tracing the flow of water currents is defeated. By adding further quantities of dye, the cost of tracing water currents becomes extremely high. Another dye used for tracing water currents is Sulfo Rhodamine B, also known as Colour Index No. 45,100 or Colour Index Acid Red 52 which has the structure,

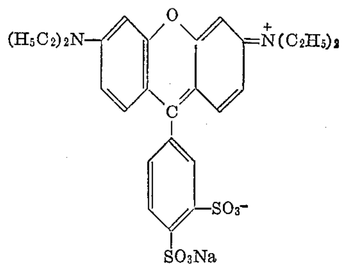

Water soluble dyes of this type exhibit less staining on siliceous material than Rhodamine B but are several times more expensive and thus are considered prohibitive for water tracing use.

2

Description of the invention

The novel dyes of the present invention show a distinct and surprising advantage over said prior art dyes when used for tracing water currents. Since sand, for example, has essentially no affinity for the novel dyes herein described and claimed, there is a very low rate of exhaustion of these dyes from the water. Consequently, the maintenance of the higher dye concentration permits the current to carry the dye down stream much farther than that shown by the prior art dyes indicated heretofore. A second and significantly important advantage of the herein described novel dyes is that they overcome the objectionable factor of dyeing the beach areas or shore lines an unsightly red in waterways where water current studies are being conducted. A third and important advantage from the point of practical usefulness is that these novel dyes are not only superior in lack of siliceous staining as described above but cost only a small fraction of the best previously used low staining water tracing dye, C.I. 45,100.

More specifically, the present invention is directed to a dye of the structure

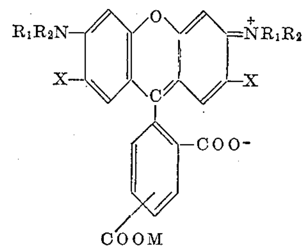

wherein $R_1$ is $C_{1-4}$ alkyl; $R_2$ is H or $C_{1-4}$ alkyl; X is H, or is $CH_3$ when $R_2$ is H; M is H, Li, Na, K or H—$NR_3R_4R_5$ where $R_3$, $R_4$ and $R_5$ separately represent H, $C_{1-4}$ alkyl, alkanol having 2 to 4 C-atoms, or $R_3$, $R_4$ and $R_5$ together with the nitrogen atom represent a monocyclic hetero ring.

The present invention also is directed to the tracing of water currents by use of a water-soluble xanthene dye described above, the aqueous solution of said dye being characterized by its property of being essentially non-staining when in contact with siliceous matter.

Representative examples further illustrating the present invention follow.

EXAMPLE I (a) A mixture of 74.6 parts of N-diethyl-m-aminophenol, 127.4 parts trimellitic anhydride and 173 parts of o-dichlorobenzene is heated to 175°–180° C. and the temperature maintained for six hours. Water and o-dichlorobenzene distill from the reaction during the heating period. The o-dichlorobenzene is separated continuously from the water and returned to the reactor or replaced intermittently with fresh solvent.

The reaction mixture is cooled below 100° C., diluted with a small amount of water, and o-dichlorobenzene removed by steam distillation. The water insoluble acidic color tar, which is the free carboxylic acid derivative, is dissolved in 400 parts of water by addition of approximately 117 parts of 2-aminoethanol which converts the acidic color to the (2-hydroxyethyl)ammonium salt. Temperatures are preferably maintained below 100° C. during neutralization to prevent formation of insoluble amides.

The dye salt thus obtained in solution form has the following structure:

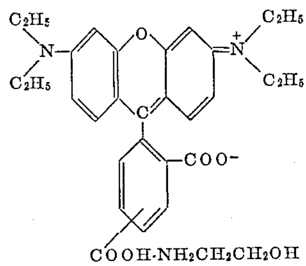

The solution of the dye salt is added to river or ocean waters for the purpose of tracing the water currents by known methods. The novel dye is essentially nonstaining when in contact with siliceous matter. The dye salt itself may be isolated by evaporating the solution to dryness, preferably under reduced pressure.

(b) In the process of part (a) of the present example, the 117 parts of 2-aminoethanol may be replaced by the following amines in the approximate quantities shown, to give dye salts having similar properties:

| Amine: | Parts |
|---|---|
| 1-amino-2-propanol | 144 |
| 3-amino-1-propanol | 144 |
| 4-amino-1-butanol | 171 |
| 2,2'-iminodiethanol | 200 |
| Morpholine | 160 |
| Pyridine | 152 |
| Piperidine | 163 |
| Ammonia | 27 |
| Methylamine | 59 |
| Ethylamine | 86 |
| Diethylamine | 140 |
| Propylamine | 113 |
| Butylamine | 140 |

In the present example, the salt of the acidic color tar may be dissolved in varying amounts of water, say about 300 to 800 or more parts, to provide the novel dye salts in different concentrations for use in the trades.

EXAMPLE II (a) The procedure of Example I(a) is followed through the condensation reaction to form the color. The acidic reaction mixture is cooled and neutralized by the addition of 77 parts of sodium hydroxide after which the o-dichlorobenzene is removed by steam distillation. The concentration of the sodium salt of the color in the final solution may be increased by the further distillation of water. In an alternate method, the sodium hydroxide may be added following distillation of the solvent.

The dye sodium salt may be isolated by evaporation of the solution to dryness. The dye salt or its solution is used to trace water currents, and is characterized by its essentially nonstaining properties when in contact with siliceous matter such as sand, rocks, concrete, etc.

(b) In the procedure of part (a) of the present example, the 77 parts of sodium hydroxide may be replaced by the following neutralizing materials in the approximate quantities shown to provide dye salts having similar properties:

| Neutralizing material: | Parts |
|---|---|
| Lithium hydroxide | 46 |
| Potassium hydroxide | 107 |
| 2,2',2''-nitrilotriethanol | 286 |

EXAMPLE III

Other aminophenols of the structure

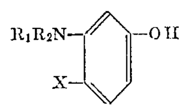

wherein $R_1$ is $C_{1-4}$ alkyl, $R_2$ is H or $C_{1-4}$ alkyl, and X is H except that when $R_2$ is H, X is $CH_3$, may be used in place of the N-diethyl-m-aminophenol of Examples I and II.

(a) In the procedures of Examples I and II, the 74.6 parts of N-diethyl-m-aminophenol is replaced with 61.9 parts of N-dimethyl-m-aminophenol to provide the analogous N-dimethyl substituted xanthene dye salts which are also suitable for use in tracing water currents, and are characterized by being essentially nonstaining when in contact with siliceous matter such as sand, rocks and the like.

(b) When the 74.6 parts of N-diethyl-m-aminophenol employed in Examples I and II is replaced with 100 parts of N-dibutyl-m-aminophenol, essentially nonstaining water-soluble dye salts are obtained.

EXAMPLE IV

In the procedures of Examples I and II the 74.6 parts of N-diethyl-m-aminophenol are replaced with 68 parts of 3-ethylamino-4-methylphenol to provide water soluble dyes which are characterized by their essentially nonstaining property when used for tracing water currents in contact with siliceous matter. The xanthene dyes in this series have the following structure, illustrated as the sodium salt:

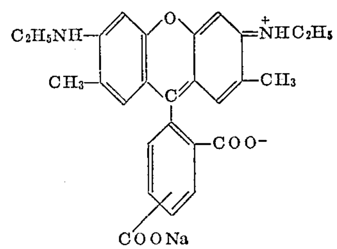

Similar dyes, useful in tracing water currents, are obtained when the 3-ethylamino-4-methylphenol employed in the present example is replaced by chemically equivalent amounts of 3-propylamino-4-methylphenol or 3-methylamino-4-methylphenol.

EXAMPLE V

Staining test for dyes used in tracing water currents: 200 parts of Ottawa Sand are added to 100 parts of aqueous dye solution containing 0.5 part of the dye prepared in Example I(a). The mixture is agitated for 15 minutes and then allowed to stand for 24 hours. The dye solution is decanted from the sand and the latter is washed with water 5 times by decantation. After filtering and drying the sand at 90° C., it is observed for the staining tendency of the dye. Compared with a sample of sand treated in the same manner with the dye of C.I. 45,100, the novel dye of Example I(a) exhibits considerably less stain.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the present invention in which a particular property or privilege is claimed are as follows:

1. The water-insoluble free carboxylic acid-containing xanthene dye obtained by the process which comprises reacting an aminophenol of the structure

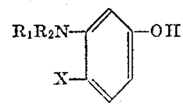

wherein $R_1$ is $C_{1-4}$ alkyl, $R_2$ is H or $C_{1-4}$ alkyl, and X is H except that when $R_2$ is H, X is $CH_3$, with trimellitic anhydride at a temperature of 175–180° C.

2. The water-soluble neutralized xanthene dye obtained by the process which comprises reacting an aminophenol of the structure

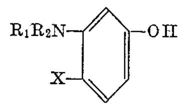

wherein $R_1$ is $C_{1-4}$ alkyl, $R_2$ is H or $C_{1-4}$ alkyl, and X is H except that when $R_2$ is H, X is $CH_3$, with trimellitic anhydride at a temperature of 175–180° C., cooling the reaction mixture below 100° C., and neutralizing the free carboxylic acid-containing xanthene dye with a member selected from the group consisting of 2-aminoethanol, 1-amino-2-propanol, 3-amino-1-propanol, 4-amino-1-butanol, 2,2'-iminodiethanol, morpholine, pyridine, piperidine, ammonia, methylamine, ethylamine, diethylamine, propylamine, butylamine, sodium hydroxide, lithium hydroxide, potassium hydroxide and 2,2'2''-nitrilotriethanol.

References Cited

FOREIGN PATENTS

| 13,010 | 7/1891 | Great Britain. |
|---|---|---|
| 28,638 | 3/1903 | Great Britain. |

NORMA S. MILESTONE, *Primary Examiner.*